(12) United States Patent
Shimazaki et al.

(10) Patent No.: US 7,860,160 B2
(45) Date of Patent: Dec. 28, 2010

(54) VIDEO ENCODING DEVICE

(75) Inventors: Hiroaki Shimazaki, Katano (JP); Takashi Masuno, Hirakata (JP); Takuma Chiba, Ibaraki (JP); Kei Tasaka, Ikoma (JP); Kenjiro Tsuda, Hirakata (JP); Tatsuro Juri, Osaka (JP); Katsuo Saigo, Kobe (JP)

(73) Assignee: Panasonic Corporation, Osaka (JP)

( * ) Notice: Subject to any disclaimer, the term of this patent is extended or adjusted under 35 U.S.C. 154(b) by 1344 days.

(21) Appl. No.: 11/354,082

(22) Filed: Feb. 15, 2006

(65) Prior Publication Data

US 2006/0280371 A1 Dec. 14, 2006

(30) Foreign Application Priority Data

Jun. 8, 2005 (JP) .............................. 2005-168727
Jan. 6, 2006 (JP) .............................. 2006-001630

(51) Int. Cl.
*H04N 7/12* (2006.01)
*H04N 9/12* (2006.01)
*G06K 9/46* (2006.01)

(52) U.S. Cl. .................... 375/240.03; 382/239; 348/723

(58) Field of Classification Search ................. 375/240, 375/240.01–240.03, 240.1, 240.16, 240.22, 375/E7.144, E7.159, E7.211, E7.033, E7.047, 375/E7.213, E7.231; 382/236–237, 239, 382/251, 253; 341/50–51, 84–85, 104; 348/723
See application file for complete search history.

(56) References Cited

U.S. PATENT DOCUMENTS

| | | | |
|---|---|---|---|
| 6,249,546 B1 * | 6/2001 | Bist | 375/240.03 |
| 6,744,387 B2 * | 6/2004 | Winger | 341/50 |
| 6,778,709 B1 * | 8/2004 | Taubman | 382/240 |
| 6,900,748 B2 * | 5/2005 | Marpe et al. | 341/107 |
| 6,982,663 B2 * | 1/2006 | Winger | 341/107 |
| 7,088,271 B2 * | 8/2006 | Marpe et al. | 341/107 |
| 7,221,296 B2 * | 5/2007 | Ziauddin et al. | 341/107 |
| 7,233,622 B2 * | 6/2007 | Winger et al. | 375/240.16 |

(Continued)

FOREIGN PATENT DOCUMENTS

CN 1223057 7/1999

(Continued)

*Primary Examiner*—Tesfaldet Bocure
*Assistant Examiner*—Lawrence B Williams
(74) *Attorney, Agent, or Firm*—Wenderoth, Lind, & Ponack, L.L.P.

(57) ABSTRACT

The present invention provides a video encoding device in which a capacity of a binary data storing unit is small, a size of the video encoding device is small, a video signal can be processed in real time, and reduction in quality of images generated from the eventually obtained data can be prevented. The video encoding device according to the present invention includes: a video encoding unit which encodes a video signal; a binarization unit which binarizes an encoded value obtained from the video encoding unit; and an entropy encoding unit which subjects entropy encoding to binary data obtained from the binarization unit. Here, the video encoding unit encodes the video signal based on a characteristic of the binarization performed by the binarization unit, so that an amount of binary data obtained from the binarization unit by binarizing the encoded value that is encoded based on the characteristic is less than an amount of binary data obtained by binarizing an encoded value that is encoded without being based on the characteristic.

29 Claims, 9 Drawing Sheets

U.S. PATENT DOCUMENTS

| | | | |
|---|---|---|---|
| 7,403,561 B2 * | 7/2008 | Kottke et al. | 375/240 |
| 7,656,326 B2 * | 2/2010 | Hussain et al. | 341/107 |
| 2004/0008769 A1 * | 1/2004 | Winger | 375/240.02 |
| 2005/0249289 A1 | 11/2005 | Yagasaki et al. | |

FOREIGN PATENT DOCUMENTS

| | | |
|---|---|---|
| JP | 6-112836 | 4/1999 |
| JP | 2004-135251 | 4/2004 |
| WO | 98/35503 | 8/1998 |

* cited by examiner

FIG. 4

| Original Encode Value | Encode Value after Binarization | | | | Number of Bits after Binarization |
|---|---|---|---|---|---|
| | UEGk prefix TU | UEGk suffix Prefix | Separator | Suffix | |
| 0 | 0 | | | | 1 |
| 1 | 10 | | | | 2 |
| 2 | 110 | | | | 3 |
| 3 | 1110 | | | | 4 |
| 4 | 11110 | | | | 5 |
| 5 | 111110 | | | | 6 |
| 6 | 1111110 | | | | 7 |
| 7 | 11111110 | | | | 8 |
| 8 | 111111110 | | | | 9 |
| 9 | 1111111110 | | | | 10 |
| 10 | 11111111110 | | | | 11 |
| 11 | 111111111110 | | | | 12 |
| 12 | 1111111111110 | | | | 13 |
| 13 | 11111111111110 | | | | 14 |
| 14 | 11111111111111 | | 0 | | 15 |
| 15 | 11111111111111 | 1 | 0 | 0 | 17 |
| 16 | 11111111111111 | 1 | 0 | 1 | 17 |
| 17 | 11111111111111 | 11 | 0 | 00 | 19 |
| 18 | 11111111111111 | 11 | 0 | 01 | 19 |
| 19 | 11111111111111 | 11 | 0 | 10 | 19 |
| 20 | 11111111111111 | 11 | 0 | 11 | 19 |
| 21 | 11111111111111 | 111 | 0 | 000 | 21 |
| 22 | 11111111111111 | 111 | 0 | 001 | 21 |
| 23 | 11111111111111 | 111 | 0 | 010 | 21 |
| 24 | 11111111111111 | 111 | 0 | 011 | 21 |
| 25 | 11111111111111 | 111 | 0 | 100 | 21 |
| 26 | 11111111111111 | 111 | 0 | 101 | 21 |
| 27 | 11111111111111 | 111 | 0 | 110 | 21 |
| 28 | 11111111111111 | 111 | 0 | 111 | 21 |
| 29 | 11111111111111 | 1111 | 0 | 0000 | 23 |
| 30 | 11111111111111 | 1111 | 0 | 0001 | 23 |
| 31 | 11111111111111 | 1111 | 0 | 0010 | 23 |
| 32 | 11111111111111 | 1111 | 0 | 0011 | 23 |
| 33 | 11111111111111 | 1111 | 0 | 0100 | 23 |
| 34 | 11111111111111 | 1111 | 0 | 0101 | 23 |
| 35 | 11111111111111 | 1111 | 0 | 0110 | 23 |
| 36 | 11111111111111 | 1111 | 0 | 0111 | 23 |
| 37 | 11111111111111 | 1111 | 0 | 1000 | 23 |
| 38 | 11111111111111 | 1111 | 0 | 1001 | 23 |
| 39 | 11111111111111 | 1111 | 0 | 1010 | 23 |
| 40 | 11111111111111 | 1111 | 0 | 1011 | 23 |
| 41 | 11111111111111 | 1111 | 0 | 1100 | 23 |
| 42 | 11111111111111 | 1111 | 0 | 1101 | 23 |
| 43 | 11111111111111 | 1111 | 0 | 1110 | 23 |
| 44 | 11111111111111 | 1111 | 0 | 1111 | 23 |
| 45 | 11111111111111 | 11111 | 0 | 00000 | 25 |
| ⋮ | ⋮ | ⋮ | ⋮ | ⋮ | ⋮ |

FIG. 5

| Original Encode Value | Encode Value after Binarization | | | | | Number of Bits after Binarization |
|---|---|---|---|---|---|---|
| | UEGk prefix TU | ----UEGk suffix---- | | | | |
| | | Prefix | Separator | Suffix | Sign | |
| 0 | 0 | | | | | 1 |
| 1 | 10 | | | | 0 | 3 |
| -1 | 10 | | | | 1 | 3 |
| 2 | 110 | | | | 0 | 4 |
| -2 | 110 | | | | 1 | 4 |
| 3 | 1110 | | | | 0 | 5 |
| -3 | 1110 | | | | 1 | 5 |
| 4 | 11110 | | | | 0 | 6 |
| -4 | 11110 | | | | 1 | 6 |
| 5 | 111110 | | | | 0 | 7 |
| -5 | 111110 | | | | 1 | 7 |
| 6 | 1111110 | | | | 0 | 8 |
| -6 | 1111110 | | | | 1 | 8 |
| 7 | 11111110 | | | | 0 | 9 |
| -7 | 11111110 | | | | 1 | 9 |
| 8 | 111111110 | | | | 0 | 10 |
| -8 | 111111110 | | | | 1 | 10 |
| | | | | | | |
| 9 | 111111111 | | 0 | 000 | 0 | 14 |
| -9 | 111111111 | | 0 | 000 | 1 | 14 |
| 10 | 111111111 | | 0 | 001 | 0 | 14 |
| -10 | 111111111 | | 0 | 001 | 1 | 14 |
| 11 | 111111111 | | 0 | 010 | 0 | 14 |
| -11 | 111111111 | | 0 | 010 | 1 | 14 |
| 12 | 111111111 | | 0 | 011 | 0 | 14 |
| -12 | 111111111 | | 0 | 011 | 1 | 14 |
| | | | | | | |
| 15 | 111111111 | | 0 | 110 | 0 | 14 |
| -15 | 111111111 | | 0 | 110 | 1 | 14 |
| 16 | 111111111 | | 0 | 111 | 0 | 14 |
| -16 | 111111111 | | 0 | 111 | 1 | 14 |
| | | | | | | |
| 17 | 111111111 | 1 | 0 | 0000 | 0 | 16 |
| -17 | 111111111 | 1 | 0 | 0000 | 1 | 16 |
| 18 | 111111111 | 1 | 0 | 0001 | 0 | 16 |
| -18 | 111111111 | 1 | 0 | 0001 | 1 | 16 |
| | | | | | | |
| 32 | 111111111 | 1 | 0 | 1111 | 1 | 16 |
| -32 | 111111111 | 1 | 0 | 1111 | 1 | 16 |
| 33 | 111111111 | 11 | 0 | 00000 | 0 | 18 |
| -33 | 111111111 | 11 | 0 | 00000 | 1 | 18 |
| 34 | 111111111 | 11 | 0 | 00001 | 0 | 18 |
| ⋮ | ⋮ | ⋮ | ⋮ | ⋮ | ⋮ | ⋮ |

VIDEO ENCODING DEVICE

BACKGROUND OF THE INVENTION

1. Field of the Invention

The present invention relates to a video encoding device for encoding video signals.

2. Description of the Related Art

In recent years, a digital video camera has been widely used to capture moving pictures (video), encode the pictures generating compressed streams, and then record digital signals of the streams onto a recording medium. For the encoding, standards of DVC, MPEG-2 (ISO/IEC 13818-2), MPEG-4 (ISO/IEC 14496-2) and the like have been intensely applied.

Moreover, a standard known as H.264 (ITU-T Rec. H.264), which is aimed initially at encoding video for teleconferences, has recently been standardized. The H.264 standard requires a greater amount of processing for encoding and decoding as compared to the MPEG-2 and MPEG-4 standards, but can achieve higher encoding efficiency.

One methods to achieve a high encoding efficiency by using entropy encoding of the H.264 standard is an encoding method called a context-based adaptive binary arithmetic coding (CABAC). In the CABAC, input data is binarized, a possibility of generation of the same binary data is calculated by an arithmetic operation depending on a context (a current target to be encoded and a situation of circumstances), and then the binary data is encoded with encode bits according to the possibility of generation of the same binary data. Thereby high-efficient encoding can be achieved. In the CABAC, however, the input data is not directly transformed. That is, the input data is encoded with bits whose number is set irregularly by updating the possibility of the generation of the binary data, so that it is necessary to increase a capacity of a buffer (binary buffer) for temporarily storing the binary data to be encoded.

In order to prevent the processing amount in the CABAC from exceeding a predetermined amount, Japanese Patent Laid-Open No. 2004-135251 publication (hereinafter, referred to as document 1) suggests a device which monitors an amount of data that is outputted by a binarization unit for generating binary data, and when the amount of data to be processed per predetermined encoding sizes reaches a predetermined value, performs an encoding that is different from a previously performed encoding.

A video encoding device 600 suggested in the document 1 includes a limitation monitor unit 62 as shown in FIG. 1. The limitation monitor unit 62 monitors, per the predetermined encoding sizes, whether or not an amount of data outputted from a binarization unit 30 in a CABAC processing unit 61 to a binary buffer 31 reaches the first value. The limitation monitor unit 62 further monitors, per the predetermined encoding sizes, whether or not an amount of data outputted from a binary arithmetic encoding unit 33 reaches the second value.

When the amount of the data outputted from the binarization unit 30 reaches the first value, or when the amount of the data outputted from the binary arithmetic encoding unit 33 reaches the second value, the limitation monitor unit 62 outputs a monitor signal to an encoding control unit 63. The encoding control unit 63 makes an orthogonal transform unit 3, a quantization unit 22, and the like repeat the same processing as performed previously for the video signal corresponding to the monitor signal. As described above, when the amount of the data outputted from the binarization unit 30 reaches the first value, the same processing as previously performed is repeated for the identical video signal. Thereby the binary data stored in the binary buffer 31 is processed during repeating of the processing, so that an available space in the binary buffer 31 is increased in practice. As a result, it is possible to reduce a capacity of the binary buffer 31.

However, in the video encoding device 600 in the document 1, when the monitor signal is outputted, the orthogonal transform unit 3, the quantization unit 22, and the like repeat the same processing as performed previously. Therefore the video encoding device 600 is not suitable as a device for processing the video signal in real time. Moreover, since the orthogonal transform unit 3, the quantization unit 22, and the like repeat the same processing as performed previously, there is a possibility that another monitor signal is outputted again from the limitation monitor unit 62. To prevent the above problem, the encoding control unit 63 changes a value of a parameter set for each component in order to reduce an amount of data to be monitored by the limitation monitor unit 62 as much as possible, and then makes the orthogonal transform unit 3, the quantization unit 22, and the like repeat the same processing. As a result, quality of images (including resolution and the like) generated from the eventually obtained data is reduced.

Furthermore, a technology as shown in FIG. 2 is also suggested. More specifically, in order to reduce the capacity of the binary buffer 31, the technology suggests that a signal is outputted from the quantization unit 22 to the outside of the video encoding device 700, instead of outputting to the CABAC processing unit 61, when the limitation control unit 62 outputs the monitor signal. In this case, however, the signal from the quantization unit 22 cannot be outputted directly to the outside of the device 700, so that it is necessary to add processing simply performed by a processing unit 75 for the signal to be outputted from the quantization unit 22 to the outside. Furthermore, it is necessary to add a selection unit 76 to the video encoding device 700 in order to select the signal obtained from the CABAC processing unit 61 or the signal obtained from the signal processing unit 75. Thereby a size of the device is increased.

SUMMARY OF THE INVENTION

In consideration of the above problems, an object of the present invention is to provide a video encoding device in which a storage unit for storing binary data has a small capacity, a size of the video encoding device is small, video signal can be processed in real time, and reduction in quality of images generated from the eventually obtained data can be prevented.

Moreover, another object of the present invention is to provide a video encoding device which can reduce an amount of data that is inputted into the unit for storing binary data, so that it is possible to reduce an amount of eventually obtained data.

To achieve the above objects, a video encoding device according to the present invention includes: a video encoding unit which encodes a video signal; a binarization unit which binarizes an encoded value obtained by the video encoding unit; and an entropy encoding unit which subjects entropy encoding to binary data obtained by the binarization unit, wherein the video encoding unit which encodes the video signal based on a characteristic of the binarization performed by the binarization unit, so that an amount of binary data obtained from the binarization unit by binarizing the encoded value that is encoded based on the characteristic is less than an amount of binary data obtained by binarizing an encoded value that is encoded without being based on the characteristic.

Thereby the video encoding unit encodes the video signal based on the characteristics of the binarization performed by the binarization unit. Therefore, according to the video encoding device of the present invention, it is possible to reduce a capacity of a binary buffer for storing the binary data, without increasing a size of the video encoding device. Furthermore, the video encoding device of the present invention does not repeat the same processing as performed previously for the identical video signal, so that it is possible to process the video signal in real time. Still further, the video encoding unit processes the video signal to obtain an encode value that is slightly different from an encode value obtained by ignoring the above characteristics, so that according to the video encoding device of the present invention it is possible to prevent reduction in the quality of images generated from eventually obtained data.

The video encoding device according to the present invention may further include: a storage unit which stores the binary data obtained by the binarization unit; and a monitor unit which monitors an amount of the binary data stored in the storage unit which is not to be subjected to the entropy encoding, wherein the video encoding unit which encodes the video signal based on the characteristic when the monitor unit detects that the amount of the binary data which is not to be subjected to the entropy encoding reaches a first storage amount.

The video encoding unit may include: an orthogonal transform unit which applies orthogonal transformation to the video signal; and an adaptive quantization unit which quantizes a value obtained by the orthogonal transform unit, wherein the adaptive quantization unit which subtracts an offset value from the value obtained by the orthogonal transform unit and to quantize the subtracted result, so that amount of binary data obtained from the binarization unit by binarizing the quantized value is less than an amount of binary data obtained by binarizing the value which is obtained by the orthogonal transform unit without subtracting the offset value.

The binarization unit may binarize the encoded value by using a Golomb encoding; when a number of bits of first binary data is larger than a number of bits of second binary data, the adaptive quantization unit is operable to subtract the offset value from the value obtained from the orthogonal transform unit and to quantize the subtracted result based on a table used in the Golomb encoding, the first binary data being obtained by subjecting the Golomb encoding to a first encoded value obtained by quantizing the value obtained from the orthogonal transform unit without subtracting the offset value, the second binary data being obtained by subjecting the Golomb encoding to a second encoded value that is a value of the first encoded value minus 1, and the first encoded value being a singular point.

More specifically, when the first encoded value is one of 15, 17, 21, 29 and 45, the adaptive quantization unit is operable to subtract the offset value from the value obtained from the orthogonal transform unit and to quantize the subtracted result.

As one example, the binarization unit may binarize the encoded value by using a Golomb encoding; and when a first Golomb encode length is longer than a second Golomb encode length, the adaptive quantization unit is operable to subtract the offset value from the value obtained from the orthogonal transform unit and to quantize the subtracted result, the first Golomb encode length being an amount of binary data which is obtained by binarizing a first encoded value obtained from the orthogonal transform unit without subtracting the offset value, and the second Golomb encode length being an amount of binary data which is obtained by binarizing a second encoded value obtained by subtracting the offset value from the first encoded value.

As another example, the binarization unit may binarize the encoded value by using a Golomb encoding; and the adaptive quantization unit is operable to: output a second encoded value when a first Golomb encode length is longer than a second Golomb encode length, the first Golomb encode length being an amount of a first binary data which is obtained by binarizing a first encoded value obtained by quantizing the value obtained from the orthogonal transform unit without subtracting the offset value, and the second Golomb encode length being an amount of a second binary data which is obtained by binarizing the second encoded value obtained by subtracting the offset value of 1 from the first encoded value; and output the first encoded value when the first Golomb encode length is equal to the second Golomb encode length.

More specifically, the adaptive quantization unit may output the second encoded value when the first encoded value is one of 15, 17, 21, 29, and 45, and output the first encoded value when the first encoded value is not any one of 15, 17, 21, 29, and 45.

The video encoding device according to the present invention may further include: a storage unit which stores the binary data obtained by the binarization unit; and a monitor unit which monitors an amount of the binary data which is stored in the storage unit and not to be subjected to the entropy encoding, wherein, when the monitor unit detects that the amount of the binary data which is not to be subjected to the entropy encoding reaches a first predetermined storage amount, the video encoding unit is operable to subtract the offset value from the value obtained from the orthogonal transform unit and to quantize the subtracted result.

In this case, the quantization unit may stop subtracting the offset value and to quantize the value obtained by the orthogonal transform unit without subtracting the offset, when the monitor unit detects that the amount of the binary data that is not subjected to the entropy encoding reaches a second predetermined storage amount after exceeding the first predetermined storage amount, the second predetermined storage amount being equal to or less than the first predetermined storage amount.

For one example, the video encoding unit may include: an orthogonal transform unit which applies orthogonal transformation to the video signal; and an adaptive quantization unit which quantizes a value obtained by the orthogonal transform unit; wherein the binarization unit which binarizes the encoded value by using a Golomb encoding; and the adaptive quantization unit may output a first encoded value when a first Golomb encode length is shorter than a second Golomb encode length, the first Golomb encode length being an amount of binary data which is obtained by binarizing the first encoded value obtained by quantizing a value obtained from the orthogonal transform unit without adding the offset value, and the second Golomb encode length being an amount of binary data which is obtained by binarizing the second encoded value obtained by adding the offset value to the value obtained from the orthogonal transform unit; and output the second encoded value when the first Golomb encode length is equal to the second Golomb encode length.

More specifically, the adaptive quantization unit may output the first encoded value when the first encoded value is one of 14, 16, 20, 28, and 44, and output the second encoded value when the first encoded value is not any one of 14, 16, 20, 28, and 44.

The video encoding unit may include a motion vector detection unit which detects a motion vector between pictures of the video signal, wherein the motion vector detection unit which selects a motion vector from respective motion vectors from a plurality of reference-picture macroblocks, so that an amount of binary data which is obtained by the binarization unit by using the selected motion vector is less than an amount of binary data which is obtained by encoding and binarizing a value of a motion vector from a reference-picture macroblock having a smallest estimation value.

For example, the binarization unit may binarize the encoded value by using a Golomb encoding; and the motion vector detection unit may select a second motion vector having at least one of a second value and a fourth value, in at least one of the following cases: a first Golomb encode length is longer than a second Golomb encode length, the first Golomb encode length being an amount of a first binary data obtained by binarizing an absolute value represented by an x-coordinate of a first motion vector from the reference-picture macroblock having the smallest estimation value, and the second Golomb encode length being an amount of a second binary data obtained by binarizing a second value that is less than the absolute value represented by the x-coordinate by a predetermined value; and a third Golomb encode length is longer than a fourth Golomb encode length, the third Golomb encode length being an amount of a third binary data obtained by binarizing an absolute value represented by a y-coordinate of the first motion vector, and the fourth Golomb encode length being an amount of a fourth binary data obtained by binarizing the fourth value that is less than the absolute value represented by the y-coordinate by a predetermined value.

More specifically, the motion vector detection unit may select the second motion vector when one of the absolute value represented by the x-coordinate and the absolute value represented by the y-coordinate of the first motion vector is one of 9, 17, and 33, and select the first motion vector when one of the absolute value represented by the x-coordinate and the absolute value represented by the y-coordinate is not any one of 9, 17, and 33.

For example, the estimation value is a sum of absolute differential values between of the reference-picture macroblock and a encoding-target-picture macroblock.

The video encoding device according to the present invention may further include: a storage unit which stores the binary data obtained by the binarization unit; and a monitor unit which monitors an amount of the binary data stored in the storage unit and not subjected to the entropy encoding, wherein, when the monitor unit detects that the amount of the binary data which is not subjected to the entropy encoding reaches a first predetermined storage amount, the motion vector detection unit is operable to select a motion vector, so that an amount of binary data which is obtained from the binarization unit by using the selected motion vector is less than an amount of binary data obtained by encoding and binarizing a value of a motion vector from the reference-picture macroblock having the smallest estimation value.

In this case, the motion vector detection may select the motion vector from the reference-picture macroblock having the smallest estimation value when the monitor unit detects that the amount of the binary data which is not subjected to the entropy encoding reaches a second predetermined storage amount after exceeding the first predetermined storage amount, the second predetermined storage amount being equal to or less than the first predetermined storage amount.

The present invention can be realized as a video encoding method which has, as steps, characteristic units of the video encoding device according to the present invention, a program which causes a computer to execute the steps, and an integrated circuit which includes the above characteristic units. The above program can be distributed via a recording medium such as a CD-ROM or a transmission medium such as a communication network.

The present invention can provide a video encoding device in which a binary buffer for storing binary data has a small capacity, a size of the video encoding device is small, video signal can be processed in real time, and reduction in quality of images generated from the eventually obtained data can be prevented.

Moreover, the present invention can provide a video encoding device which can reduce an amount of data that is inputted into the buffer for storing binary data, so that it is possible to reduce an amount of eventually obtained data.

More specifically, according to the video encoding device of the present invention, it is possible to reduce a capacity of the binary buffer for storing binary data even if a CABAC processing unit for performing entropy encoding is formed in the device, without adding a large-sized encoding amount control circuit to the video encoding device, and it is also possible to prevent reduction in the quality of images generated from the eventually obtained data.

FURTHER INFORMATION ABOUT TECHNICAL BACKGROUND TO THIS APPLICATION

The disclosures of Japanese Patent Applications Nos. 2005-168727 filed on Jun. 8, 2005, and 2006-1630 filed on Jan. 6, 2006 including specifications, drawings and claims are incorporated herein by references in their entirety.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 4 is a diagram showing relationships between "original encode values" which are quantized values not yet subjected to binarization processing by a binarization unit 30 and "encode values after binarization" which are encode values after the binarization unit 30 applies the binarization processing to the "original encode values";

FIG. 5 is a diagram showing relationships between "original encode values" which are motion vector values not yet subjected to the binarization processing by the binarization unit 30 and "encode values after binarization" which are encode values after the binarization unit 30 applies the binarization processing to the "original encode values";

DESCRIPTION OF THE PREFERRED EMBODIMENT(S)

The following describes a preferred embodiment for carrying out the present invention with reference to the drawings.

Firstly, a structure of a video encoding device 100 according to the present embodiment is described with reference to FIG. 3.

Figure 1:
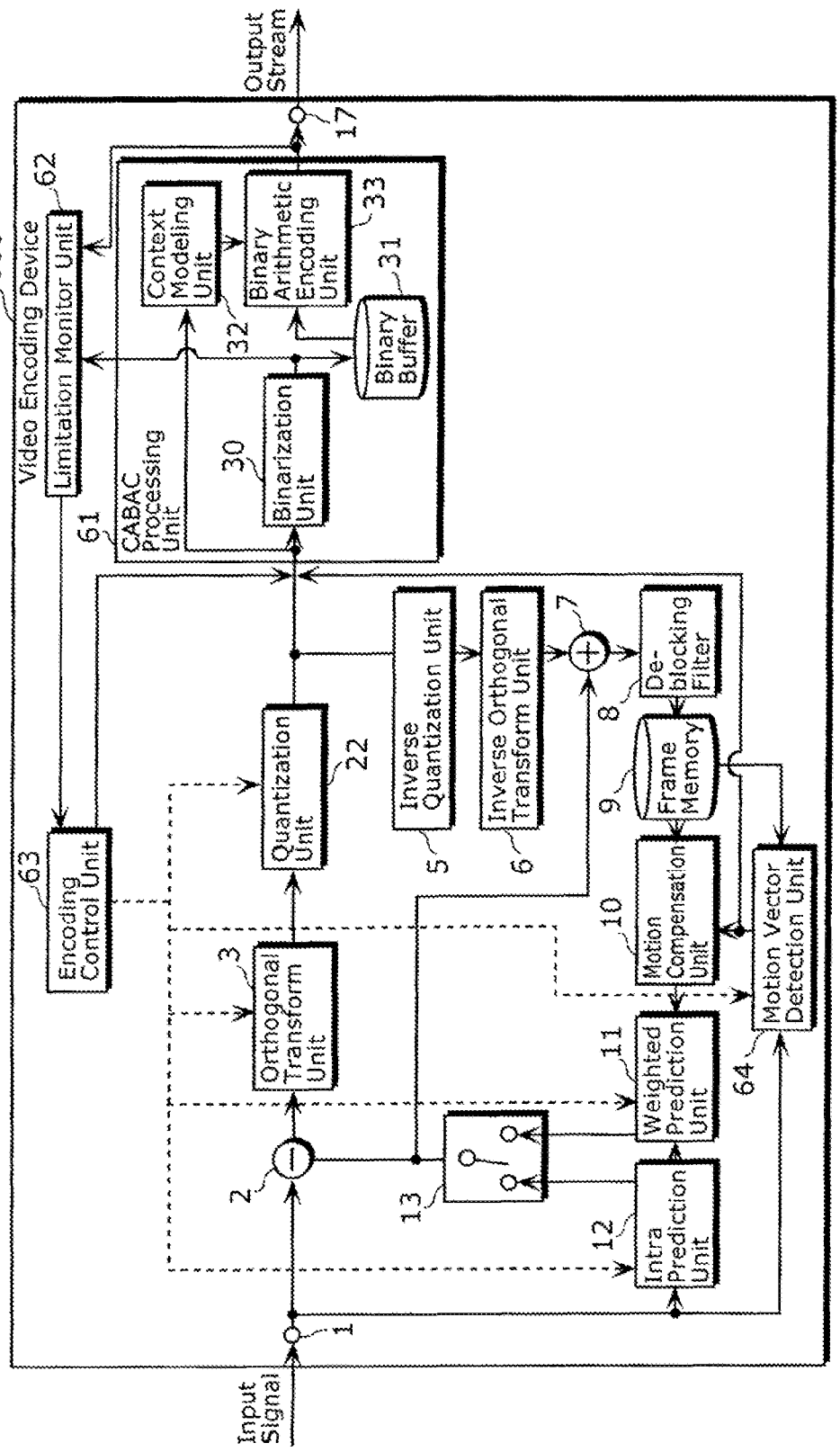
FIG. 1 is a block diagram of the conventional video encoding device 600.
Figure 2:
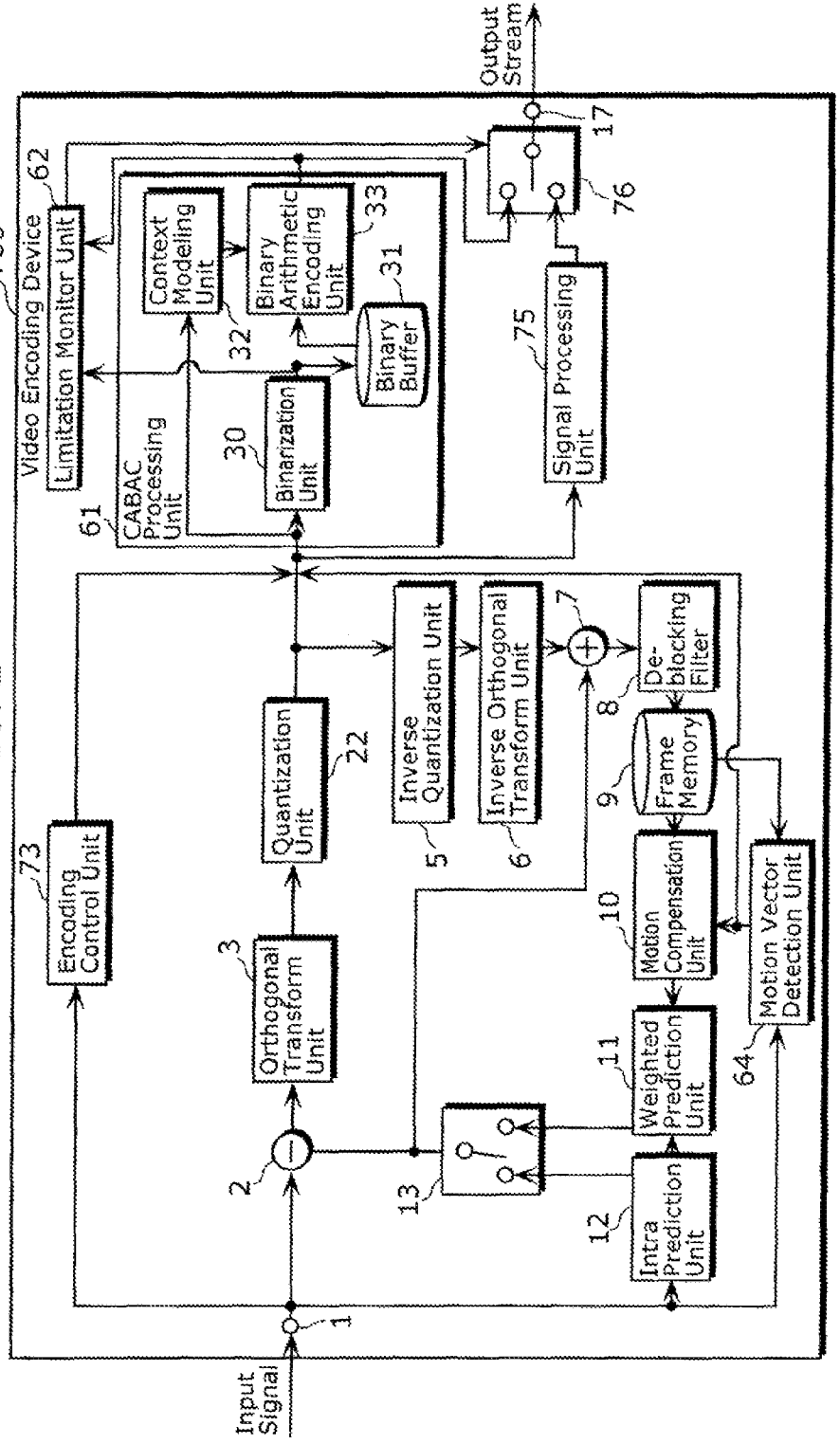
FIG. 2 is a block diagram of the conventional video encoding device 700.
Figure 3:
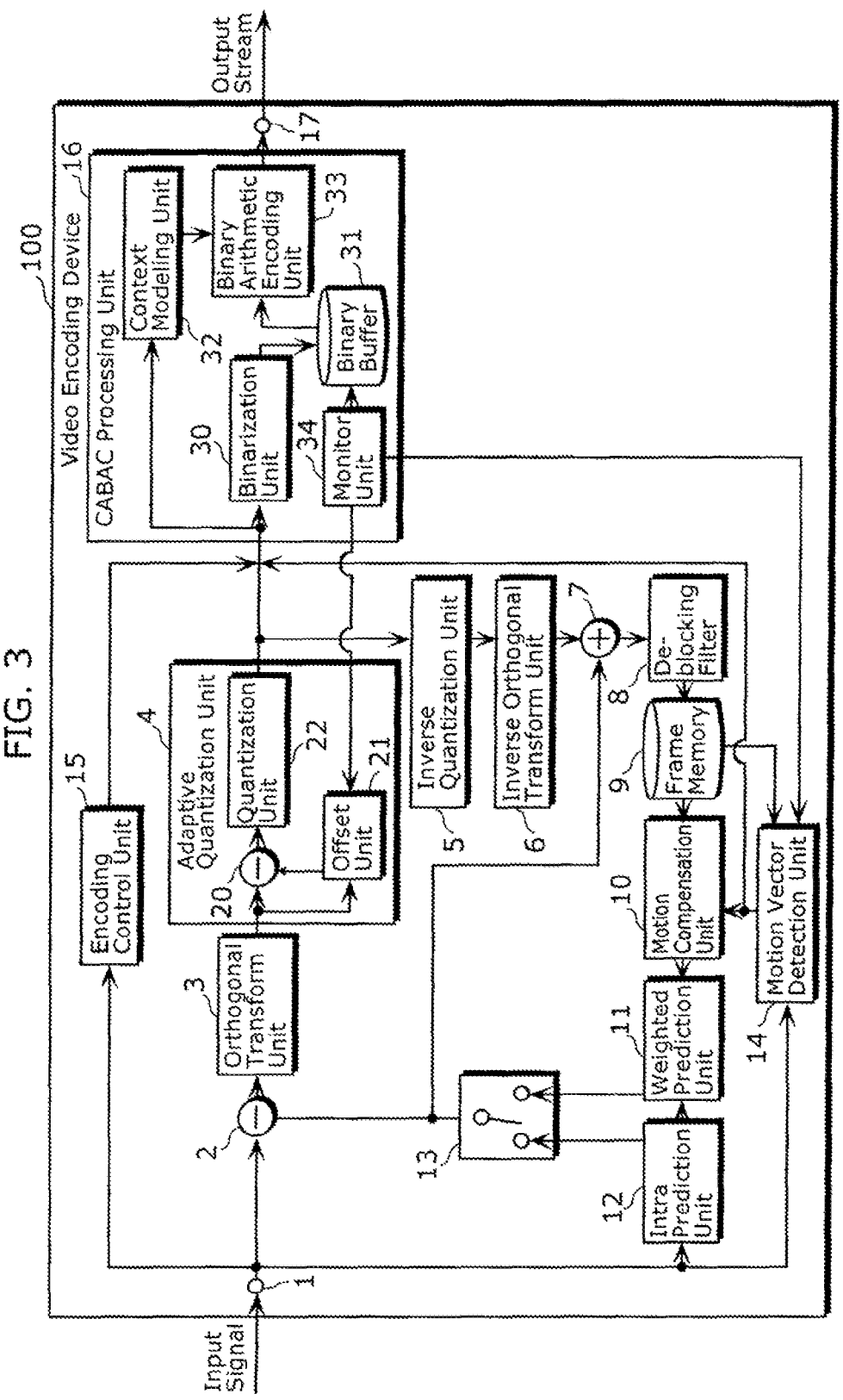
FIG. 3 is a block diagram of a video encoding device 100 according to the present embodiment.

FIG. 3 is a block diagram of the video encoding device 100 according to the present embodiment. The video encoding device 100 is a device for encoding a video signal. As shown in FIG. 3, the video encoding device 100 includes an input terminal 1, a subtracter 2, an orthogonal transform unit 3, an adaptive quantization unit 4, an inverse quantization unit 5, an inverse orthogonal transform unit 6, an adder 7, a de-blocking filter 8, a frame memory 9, a motion compensation unit 10, a weighted prediction unit 11, an intra prediction unit 12, a selection unit 13, a motion vector detection unit 14, an encoding control unit 15, a CABAC processing unit 16, and an output terminal 17.

The input terminal 1 is a terminal into which a moving video signal is inputted. The subtracter 2 generates a predictive residual signal by subtracting the signal obtained from the input terminal 1 with a signal obtained from the selection unit 13. The orthogonal transform unit 3 applies orthogonal transformation to the predictive residual signal obtained from the subtracter 2 to output transform coefficients. The adaptive quantization unit 4 quantizes the transform coefficients and the like obtained from the orthogonal transform unit 3. Note that the adaptive quantization unit 4 will be described in more detail further below. The inverse quantization unit 5 applies inverse quantization to the signal obtained from the adaptive quantization unit 4. The inverse orthogonal transform unit 6 applies inverse orthogonal transformation to the signal obtained from the inverse quantization unit 5.

The adder 7 adds the signal obtained from the inverse orthogonal transform unit 6 and the signal obtained from the selection unit 13 to generate a decoded video signal. The de-blocking filter 8 applies de-blocking filtering to the decoded video signal obtained from the adder 7. The frame memory 9 stores the video signal obtained from the de-blocking filter 8. The motion compensation unit 10 applies motion compensation to the video signal stored in the frame memory 9 using a motion vector obtained from the motion vector detection unit 14. The weighted prediction unit 11 applies weighted prediction to the video signal obtained from the motion compensation unit 10.

The intra prediction unit 12 applies intra prediction to the signal obtained from the input terminal 1. The selection unit 13 selects the signal obtained from the weighted prediction unit 11 or the signal obtained from the intra prediction unit 12. The motion vector detection unit 14 detects a motion vector from a reference-picture macroblock in a picture stored in the frame memory 9 to an encoding-target-picture macroblock in a picture to be encoded. The encoding control unit 15 controls the encoding applied to the signal based on such signal obtained from the input terminal 1. The CABAC processing unit 16 performs a CABAC (entropy encoding). Note that a detailed structure of the CABAC processing unit 16 will be described further below. The output terminal 17 is a terminal for outputting the signal processed by the CABAC processing unit 16 to the outside of the video encoding device 100.

The adaptive quantization unit 4 includes a subtracter 20, an offset unit 21, and a quantization unit 22. The subtracter 20 subtracts the signal obtained from the orthogonal transform unit 3 with an offset value obtained from the offset unit 21. When the offset unit 21 receives the first monitor signal from the monitor unit 34 formed in the CABAC processing unit 16, the offset unit 21 generates the offset value based on the signal obtained from the orthogonal transform unit 3 and outputs the offset value to the subtracter 20. By using the offset value, a below-described binarization unit 30 can obtain a certain binary data. Here, a length of the certain binary data is shorter than the first Golomb encode length. Note that the first Golomb encode length is a length of binary data which is obtained by quantizing the signal obtained from the orthogonal transform unit 3 without subtracting the offset value and then binarizing the quantized signal by the binarization unit 30. The quantization unit 22 quantizes the signal obtained from the subtracter 20.

Figure 6:
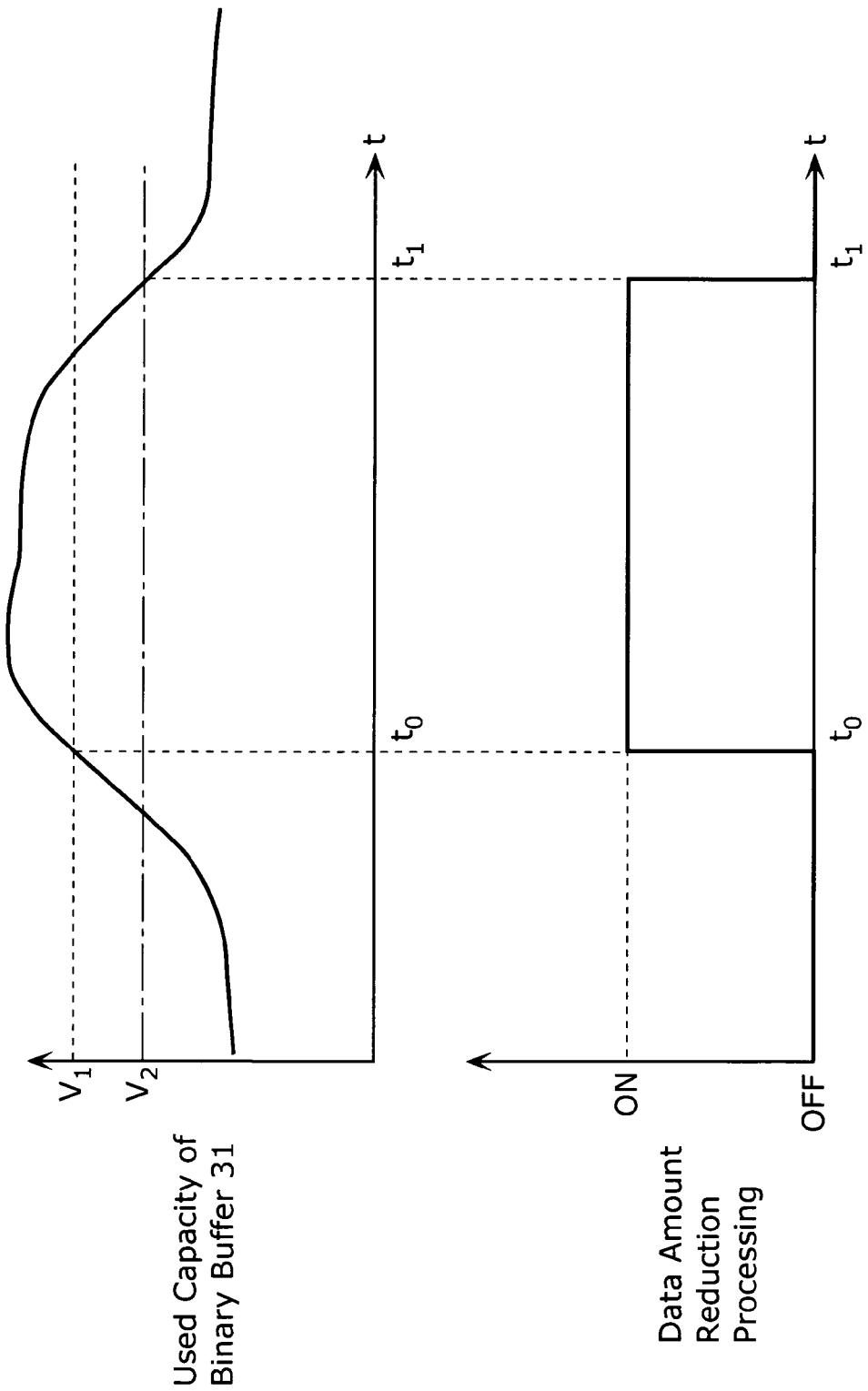
FIG. 6 is a diagram showing timings of an operation performed by an adaptive quantization unit 4 and a motion vector detection unit 14 in order to reduce an encode length of binary data generated by the binarization unit 30.

The CABAC processing unit 16 includes a binarization unit 30, a binary buffer 31, a context modeling unit 32, a binariy arithmetic encoding unit 33, and a monitor unit 34. The binarization unit 30 binarizes the signal obtained from the adaptive quantization unit 4 and the motion vector detection unit 14, by using an Exponential Golomb encoding (hereinafter, referred to as an exp-Golomb encoding or a Golomb encoding). The binary buffer 31 stores the binary data obtained from the binarization unit 30. The context modeling unit 32 performs context modeling based on the signal obtained from the adaptive quantization unit 4 and the motion vector detection unit 14. The binary arithmetic encoding unit 33 applies arithmetic encoding to the binary data stored in the binary buffer 31 based on a result obtained from the context modeling unit 32. The monitor unit 34 monitors a usage situation of the binary buffer 31, and when the monitor unit 34 detects that an amount of the binary data which is stored in the binary buffer 31 and not applied with the entropy encoding reaches the first storage amount V1 as shown in FIG. 6, the monitor unit 34 outputs the first monitor signal to the motion vector detection unit 14, and the offset unit 21 in the adaptive quantization unit 4.

Note that, in the present embodiment, the orthogonal transform unit 3, the adaptive quantization unit 4, and the motion vector detection unit 14 are used as one example of the video encoding unit, the binarization unit 30 is used as one example of the binarization unit, and the context modeling unit 32 and the binariy arithmetic encoding unit 33 are used as one example of the entropy encoding unit, regarding the video encoding device according to the present invention.

Next, the binarization processing applied by the binarization unit 30 to the signal (quantized encode value) obtained from the adaptive quantization unit 4 is described with reference to FIG. 4. FIG. 4 is a diagram showing relationships between "original encode values" which are quantized values not yet applied with the binarization processing by the binarization unit 30 and "encode values after binarization" which are encode values after the binarization unit 30 applies the binarization processing to the "original encode values".

As shown in FIG. 4, when an original encode value x is equal to or less than "13", the binarization unit 30 binarizes the value x by using Truncated Unary (TU) (cMax=14). When the original encode value x is equal to or more than "14", the binarization unit 30 binarizes a value (x–14) by using the exp-Golomb encoding, and adds the binarized value to the end of "11111111111111" (14 bits) to obtain binary data of the original encode value x. The number of bits of the binary data is increased as the original encode value x is increased, for example, when the original encode value x is "14", the number of bits is "15 bits"; when the original encode value x is "15", the number of bits is "17 bits"; and when the original encode value x is "17", the number of bits is "19 bits".

Next, the binarization processing applied by the binarization unit 30 to a signal (a value of an encoded motion vector) obtained from the motion vector detection unit 14 is described with reference to FIG. 5. FIG. 5 is a diagram showing relationships between "original encode values" which are motion vector values not yet subjected to binarization processing by the binarization unit 30 and "encode values after binarization" which are encode values after the binarization unit 30 applies the binarization processing to the "original encode values".

As shown in FIG. 5, when an absolute value of an original encode value x is equal to or less than "8", the binarization unit 30 binarizes the value x by using TU. When an absolute value of the original encode value x is equal to or more than "9", the binarization unit 30 binarizes a value of the absolute value of original encode value x minus the value "9" by using the exp-Golomb encoding based on whether the original encode value x is positive or negative, and adds the binarized value to the end of "111111111" (9 bits) to obtain binary data of the original encode value x. The number of bits of the binary data is increased as the original encode value x is increased, for example, when the original encode value x is "9", the number of bits is "14 bits"; when the original encode value x is "17", the number of bits is "16 bits"; and when the original encode value x is "33", the number of bits is "18 bits".

In the video encoding device 100 according to the present embodiment, the monitor unit 34 monitors a usage situation of the binary buffer 31, and when the binary buffer 31 is detected to nearly cause overflow, in other words, when the monitor unit 34 detects that as shown in FIG. 6 an amount of the binary data which is stored in the binary buffer 31 and not applied with the entropy encoding reaches the first storage amount V1, the monitor unit 34 outputs the first monitor signal to the motion vector detection unit 14, and the offset unit 21 in the adaptive quantization unit 4.

(Operation of Adaptive Quantization Unit 4)

The offset unit 21 in the adaptive quantization unit 4 generates an offset value. By using the offset value, the binarization unit 30 can obtain a certain binary data. Here, a length of the certain binary data is shorter than a length of directly-obtained binary data. Note that the directly-obtained binary data is obtained by quantizing the signal obtained from the orthogonal transform unit 3 without subtracting the offset value and then binarizing the quantized signal by the binarization unit 30.

For example, when a value (original encode value) obtained by quantizing an absolute value of the transform coefficients obtained from the orthogonal transform unit 3 is "17", an encode length of binary data obtained from the binarization unit 30 is "19 bits" as shown in FIG. 4. On the other hand, when the original encode value is "16" that is a value of "17" minus "1", an encode length of binary data obtained from the binarization unit 30 is "17 bits" as shown in FIG. 4. Thus, the encode length of the binary data in case of the original encode value "17" is two bits longer than the encode length of the binary data in case of the original encode value "16".

In general, even if a value obtained by quantizing the absolute value of the transform coefficients outputted from the orthogonal transform unit 3 is slightly changed by "1", the quality of images is not significantly affected. Therefore, when the first monitor signal is received, if the value which is obtained by quantizing the absolute value of the transform coefficients obtained from the orthogonal transform unit 3 can be predicted to be "17", the offset unit 21 generates an offset value in order to obtain a quantized value "16".

The subtracter 20 subtracts the signal obtained from orthogonal transform unit 3 with the offset value obtained from the offset unit 21. Then the quantization unit 22 quantizes the signal obtained from the subtracter 20 to generate a value of "16". The binarization unit 30 binarizes the value of "16" to generate binary data having "17 bits", and stores the generated binary data in the binary buffer 31.

The signal obtained from the orthogonal transform unit 3 without subtracting the offset value is quantized to obtain a value of "17", and the value of "17" is binarized to obtain the binary data having "19 bits". In the present embodiment, however, when the first monitor signal is received, if a value obtained by quantizing the signal obtained from the orthogonal transform unit 3 without subtracting the offset value can be predicted to be "17", the offset unit 21 generates an offset value in order to obtain a quantized value "16". A length of the binary data obtained by binarizing the value of "17" is "19 bits", and on the other hand a length of the binary data obtained by binarizing the value of "16" is "17 bits". Thereby, data stored in the binary buffer 31 is decreased by two bits. Therefore, it is possible to reduce the capacity of the binary buffer 31.

Thus, when the first monitor signal is received, the offset unit 21 generates an offset value in order to reduce the binary data obtained by binarizing performed by the binarization unit 30. As described above, even if a value obtained by quantizing the absolute value of the transform coefficients is slightly changed by "1", the quality of images is not significantly affected. Therefore, the offset unit 21 generates an offset value by which the quantization unit 22 can obtain the second value, when an encode length of the second binary data is shorter than an encode length of the first binary data. Note that the first value is obtained by quantizing the signal obtained from the orthogonal transform unit 3 without subtracting the offset value, and that the second value is less by "1" than the first value. Note also that the first binary data is obtained by binarizing the first value, and that the second binary data is obtained by binarizing the second value.

As an example besides the above, as shown in FIG. 4, (1) when a value (the first value) obtained by quantizing the signal from the orthogonal transform unit 3 without subtracting the offset value is "15" (the number of bits of the binary data after binarization is "17"), the offset unit 21 generates an offset value by which the quantization unit 22 can obtain a value of "14" (the second value: the number of bits of the binary data after binarization is "15"). For another example, (2) when the first value is "21" (the number of bits of the binary data after binarization is "21"), the offset unit 21 generates an offset value by which the quantization unit 22 can obtain the second value of "20" (the number of bits of binary data after binarization is "15"). For still another example, (3) when the first value is "29" (the number of bits of the binary data after binarization is "23"), the offset unit 21 generates an offset value by which the quantization unit 22 can obtain the second value of "28" (the number of bits of binary data after binarization is "21"). For still another example, (4) when the first value is "45" (the number of bits of binary data after binarization is "25"), the offset unit 21 generates an offset value by which the quantization unit 22 can obtain the second value of "44" (the number of bits of binary data after binarization is "23").

Here, based on the relationships between the "original encode values" and the "encode values after binarization" in FIG. 4 for example, the first value is defined as a "singular point" when the number of bits of a certain second binary data is larger than the number of bits of another second binary data.

Note that the certain second binary data is obtained by applying the Golomb encoding to a value (the first value) which is obtained by quantizing the signal obtained from the orthogonal transform unit 3 without subtracting the offset value. Note also that the second binary data is obtained by applying the Golomb encoding to the second value that is a value of the first value minus "1". As shown in FIG. 4, the "singular points" are "15", "17", "21", "29", "45" and the like. Therefore, when the first value is the "singular point", the offset unit 21 generates an offset value by which the quantization unit 22 can obtain the second value that is a value of the first value minus "1".

Thereby, according to the video encoding device 100 of the present embodiment, it is possible to reduce the capacity of the binary buffer 31 without adding processing for reducing the capacity of the binary buffer 31. It is also possible to process the video signal in real time. It is further possible to prevent a reduction in the quality of images (including resolution and the like) generated from the eventually obtained data.

Note that the offset unit 21 may generate an offset value in order to decrease a quantized value by a value that is equal to or more than "2". For example, when a value (the first value) obtained by quantizing the signal from the orthogonal transform unit 3 without subtracting the offset value is "19" (the number of bits of the binary data after binarization is "19"), the offset unit 21 generates an offset value by which the quantization unit 22 can obtain a value of "16" that is a value of the first value minus "3" (the second value: the number of bits of the binary data after binarization is "17"). Thus, even if the offset unit 21 sets an offset value in order to decrease a quantized value by a value that is equal to or more than "2", the amount of the binary data obtained by binarization performed by the binarization unit 30 can be reduced. Therefore, it is possible to reduce the capacity of the binary buffer 31. Furthermore, it is possible to process the video signal in real time. However, the quality of images (including resolution and the like) generated from the eventually obtained data is reduced. If the reduction in the quality of images is not a problem, the offset unit 21 may generate an offset value in order to decrease a quantized value by a value that is equal to or more than "2".

In the meantime, after outputting the first monitor signal, when the monitor unit 34 detects that an amount of the binary data which is stored in the binary buffer 31 and not applied with the entropy encoding reaches the second storage amount V2 that is less than the first storage amount V1 as shown in FIG. 6 by the operation of the adaptive quantization unit 4 and the operation of the motion vector detection unit 14, the monitor unit 34 outputs the second monitor signal to the motion vector detection unit 14, and the offset unit 21 in the adaptive quantization unit 4.

In this case, the binary buffer 31 is detected to have enough available space, so that in the adaptive quantization unit 4, the offset unit 21 stops generating offset values and the quantization unit 22 quantizes the signal obtained from the orthogonal transform unit 3 without subtracting the offset value.

Note that the second storage amount V2 may be equal to the first storage amount V1.

Figure 7:
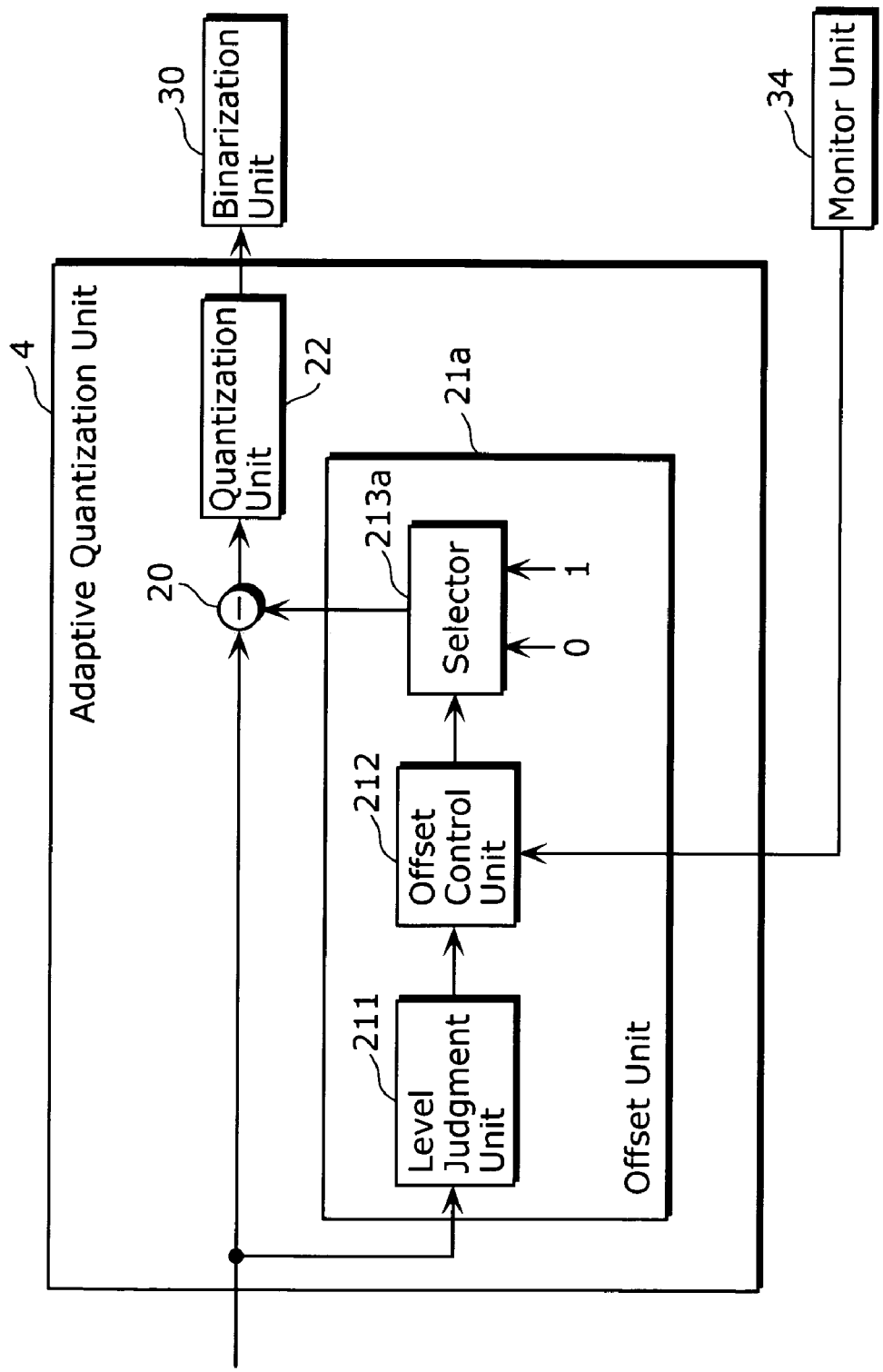
FIG. 7 is a diagram showing one example of a structure of the adaptive quantization unit 4.

Note also that the adaptive quantization unit 4 may have a structure shown in FIG. 7. In an offset unit 21*a*, a level judgment unit 211 holds information indicating the relationships between the "original encode values" and the "encode values after binarization" as shown in FIG. 4 for example, and judges whether or not a value obtained by quantizing the signal from the orthogonal transform unit 3 without subtracting the offset value is a "singular point". If the first value is judged as the "singular point", then the offset control unit 212 receives the first monitor signal from the monitor unit 34, and the offset control unit 212 provides, to a selector, 213*a* a control signal in order to subtract "1" from the value obtained from the orthogonal transform unit 3, so that it is possible to reduce the amount of binary data obtained by binarization performed by the binarization unit 30. If the control signal is received, then the selector 213*a* outputs "1". If the control signal is not received, then the selector 213*a* outputs "0". The subtracter 20 subtracts the value obtained from the orthogonal transform unit 3 with the offset value obtained from the offset unit 21*a* (selector 213*a*). This means that the subtracter 20 subtracts the value obtained from the orthogonal transform unit 3 with an offset value "1" only when the offset control unit 212 outputs the control signal to the selector 213*a*.

More specifically, (a) the adaptive quantization unit 4 outputs the second encode value, when the first Golomb encode length is longer than the second Golomb encode length. Note that the first Golomb encode length is an amount of the first binary data which is obtained by binarizing the first encode value which is obtained by quantizing the value obtained from the orthogonal transform unit 3 without subtracting the offset value. Note also that the second Golomb encode length is an amount of the second binary data which is obtained by binarizing the second encode value which is obtained by subtracting the first encode value with an offset value "1". (b) The adaptive quantization unit 4 outputs the first encode value when the first Golomb encode length is equal to the second Golomb encode length. Also in this case, according to the video encoding device 100 of the present embodiment, it is possible to reduce the capacity of the binary buffer 31 without adding processing for reducing the capacity of the binary buffer 31. It is also possible to process the video signal in real time. It is further possible to prevent from reduction in the quality of images (including resolution and the like) generated from the eventually obtained data.

Figure 8:
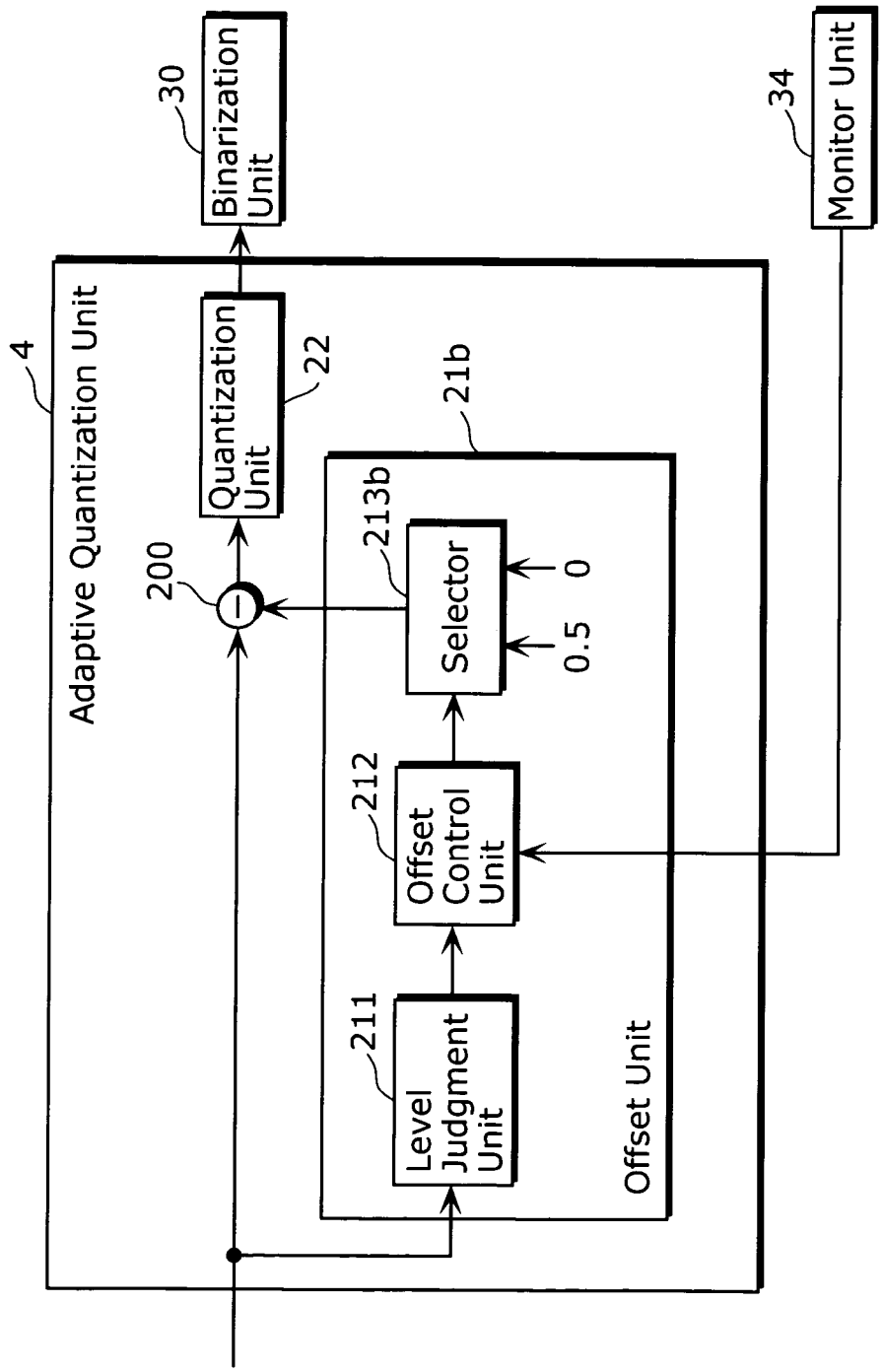
FIG. 8 is a diagram showing another example of the structure of the adaptive quantization unit 4.

Furthermore, the adaptive quantization unit 4 may have a structure as shown in FIG. 8. In an offset unit 21*b*, the level judgment unit 211 holds information indicating the relationships between the "original encode values" and the "encode values after binarization" as shown in FIG. 4 for example, and judges whether or not a value (the first value) obtained by quantizing the signal from the orthogonal transform unit 3 without subtracting the offset value is a value of the singular point minus "1" ("singular point−1"). If the first value is judged as the "singular point−1", when the offset control unit 212 receives the first monitor signal from the monitor unit 34, the offset control unit 212 outputs to a selector 213*b* a control signal in order to add the value obtained from the orthogonal transform unit 3 with "0", so that it is possible to reduce the amount of binary data obtained by binarization performed by the binarization unit 30. If the control signal is received from the offset control unit 212, then the selector 213*b* outputs "0". If the control signal is not received, then the selector 213*a* outputs "0.5". An adder 200 adds the offset value obtained from offset unit 21*b* (selector 213*b*). That is, the adder 200 usually adds a value obtained from the orthogonal transform unit 3 with a value of "0.5", and when the offset control unit 212 outputs a control signal to the selector 213*b*, the adder 200 stops the adding processing. The quantization unit 22 obtains the quantized value by counting fractions over one half as one and disregards the rest.

This means that (a) the adaptive quantization unit 4 outputs the first encode value, when the first Golomb encode length is shorter than the second Golomb encode length. Note that the first Golomb encode length is an amount of the binary data which is obtained by binarizing the first encode value which is obtained by quantizing the value obtained from the orthogonal transform unit 3 without adding the offset value. Note also that the second Golomb encode length is an amount of the binary data which is obtained by binarizing the second encode value which is obtained by quantizing a result of adding the value from the orthogonal transform unit 3 with the offset value. (b) The adaptive quantization unit 4 outputs the second encode value, when the first Golomb encode length is equal to the second Golomb encode length. Also in this case, according to the video encoding device 100 of the present embodiment, it is possible to reduce the capacity of the binary buffer 31 without adding processing for reducing the capacity of the binary buffer 31. It is also possible to process the video signal in real time. It is further possible to prevent reduction in the quality of images (including resolution and the like) generated from the eventually obtained data.

(Operation of Motion Vector Detection Unit 14)

As described above, when the binary buffer 31 is detected to nearly cause overflow, in other words, when the monitor unit 34 detects that an amount of the binary data which is stored in the binary buffer 31 and not applied with the entropy encoding reaches the first storage amount V1 as shown in FIG. 6, the monitor unit 34 outputs the first monitor signal to the motion vector detection unit 14, and the offset unit 21 in the adaptive quantization unit 4.

In the following description regarding the operation of the motion vector detection units 14, a sum of absolute differential values (SAD) is used as an estimation value of a motion vector.

When the first monitor signal is received, the motion vector detection unit 14 selects a motion vector from motion vectors from reference-picture macroblocks in a reference picture to an encoding-target-picture macroblock in a picture to be encoded. Here, among the reference-picture macroblocks, a macroblock having the smallest SAD is referred to as the first reference-picture macroblock. By using the selected motion vector, the binarization unit 30 can obtain a certain binary data. Here, an amount of the certain binary data is smaller than an amount of another binary data, though a SAD of the certain binary data is larger than the SAD of the another binary data. Here, the another binary data is obtained by encoding and binarizing a motion vector from the first reference-picture macroblock.

Figure 9:
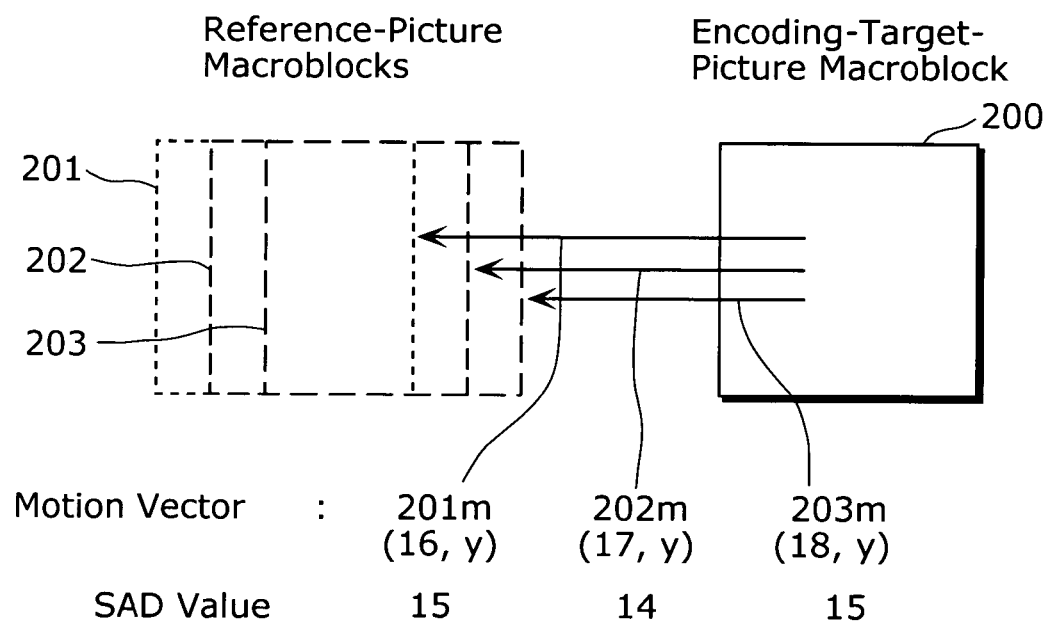
FIG. 9 is a diagram showing a plurality of reference pictures and motion vectors from the respective reference pictures.

As shown in FIG. 9, for example, it is assumed that the reference picture has the first reference-picture macroblock 202 having the smallest SAD "14", and the second reference-picture macroblock 201 and the third reference-picture macroblock 203 both of which have each SAD value "15" that is larger by "1" than "14" that is the SAD of the first reference-picture macroblock 202. Note that the first reference-picture macroblock 202, the second reference-picture macroblock 201, or the third reference-picture macroblock 203 will be used to predict a part of the picture to be encoded and the motion vector detection unit 14 detects a motion vectors from candidate motion vectors from these candidate reference-picture macroblocks. It is also assumed that a motion vector from the first reference-picture macroblock 202 is referred to as a motion vector 202*m*, a motion vector from the second reference-picture macroblock 201 is referred to as a motion vector 201*m*, and a motion vector from the third reference-picture macroblock 203 is referred to as a motion vector 203*m*. It is further assumed that the motion vector 202*m* is represented by (17, y), the motion vector 202*m* is represented by (16, y), and the motion vector 202*m* is represented by (18, y). Note that a component along the x coordinate is hereinafter referred to as an x-component and a component along the y coordinate is hereinafter referred to as a y-component.

Regarding the three reference-picture macroblocks shown in FIG. 9, the respective motion vectors are estimated from the respective reference-picture macroblocks and will be used to predict the encoding-target-picture macroblock 200, and y-components of the respective motion vectors are identical. Therefore, x-components of the respective motion vectors are focused. An x-component of the motion vector 202*m* from the first reference-picture macroblock 202 to the encoding-target-picture macroblock 200 is "17", so that an encode length of binary data obtained by binarizing the x-component by the binarization unit 30 is "16 bits" as shown in FIG. 5. Further, an x-component of the motion vector 201*m* from the second reference-picture macroblock 201 to predict the encoding-target-picture macroblock 200 is "16", so that an encode length of binary data obtained from the binarization unit 30 by binarizing the x-component by the binarization unit 30 is "14 bits" as shown in FIG. 5. Furthermore, an x-component of the motion vector 203*m* from the third reference-picture macroblock 203 to predict the encoding-target-picture macroblock 200 is "18", so that an encode length of binary data obtained from the binarization unit 30 by binarizing the x-component by the binarization unit 30 is "16 bits" as shown in FIG. 5.

Even if the SAD is slightly changed by "1", the quality of images is not significantly affected. Therefore, when the first monitor signal is received, the motion vector detection unit 14 selects the motion vector 201*m* from the second reference-picture macroblock 201, namely, the motion vector 201*m* (16, y). By binarizing the x-component "16" of the motion vector 201*m*, the binarization unit 30 can obtain binary data whose encode length is "14 bits" that is the shortest in the encode lengths of other binary data.

Therefore, the binarization unit 30 binarizes "16" that is the x-component of the motion vector, generates binary data having "14 bits", and stores the binary data into the binary buffer 31.

By binarizing the x-component "17" of the motion vector 202*m* (17, y) having the smallest SAD, an encode length of the generated binary data is "16 bits". However, in the present embodiment, when the first monitor signal is received, the motion vector detection unit 14 selects the motion vector 201*m* (15, y) of the second reference-picture macroblock 201, not the above motion vector 202*m*. By binarizing the x-component "15" by the binarization unit 30, an encode length of the obtained binary data becomes "14 bits". As a result, data to be stored in the binary buffer 31 can be reduced by two bits. Thereby, it is possible to reduce the capacity of the binary buffer 31.

Thus, when the first monitor signal is received, the motion vector detection unit 14 selects a motion vector. Note that the motion vector is selected from motion vectors from reference-picture macroblocks having SADs larger than the smallest SAD of the first reference-picture macroblock. By using the selected motion vector, the binarization unit 30 can obtain binary data whose amount is less than an amount of binary data which is obtained encoding and binarizing a value of a motion vector from the first reference-picture macroblock.

For example, it is assumed that an absolute value of the x-component of the motion vector from the first reference-picture macroblock having the smallest SAD is "9", and an absolute value of the x-component of the motion vector from the second reference-picture macroblock having a SAD that is larger by "1" than the SAD of the first reference-picture macroblock is "8". In this case, as shown in FIG. 5, an amount of the first binary data which is obtained by applying binarization (Golomb encoding) to "9" that is the absolute value of the x-component of the motion vector from the first reference-picture macroblock is "14 bits", and an amount of the second binary data which is obtained by applying binarization (Golomb encoding) to "8" that is the absolute value of the x-component of the motion vector from the second reference-picture macroblock is "10 bits". Therefore, the motion vector detection unit 14 selects the motion vector from the second reference-picture macroblock so that binary data having a small amount can be obtained after binarization.

A further example besides the above is assumed that the absolute value of the x-component of the motion vector from the first reference-picture macroblock is "33" and the absolute value of the x-component of the motion vector from the second reference-picture macroblock having a SAD that is larger by "1" than the SAD of the fist reference-picture macroblock is "32". In this case, as shown in FIG. 5, an amount of the first binary data which is obtained by applying binarization (the Golomb encoding) to the value "33" that is the absolute value of the x-component of the motion vector from the first reference-picture macroblock becomes "18 bits", and the amount of the second binary data which is obtained by applying (the Golomb encoding) to the value "32" that is the absolute value of the x-component of the motion vector from the second reference-picture macroblock becomes "16 bits". Therefore, the motion vector detection unit 14 selects the motion vector from the second reference-picture macroblock so that binary data having a small amount can be obtained after binarization.

As described above, even if the SAD is slightly changed by "1", the quality of images is not significantly affected. Therefore, the motion vector detection unit 14 selects a motion vector by which binary data can be generated to have the shortest encode length, when an encode length of a certain binary data is shorter than an encode length of another binary data. Note that the certain binary data is obtained by encoding and binarizing a value of one of motion vectors from reference-picture macroblocks having SADs that are larger by "1" than the smallest SAD of the first reference-picture macroblock, and that the another binary data is obtained by encoding and binarizing a value of a motion vector from the first reference-picture macroblock having the smallest SAD. Thereby, binary data having a small amount can be obtained after binarization.

Thus, according to the video encoding device 100 of the present embodiment, it is possible to reduce the capacity of the binary buffer 31 without adding processing for reducing the capacity of the binary buffer 31. It is also possible to process the video signal in real time. It is further possible to prevent reduction in the quality of images (including resolution and the like) generated from the eventually obtained data.

Note that, to simplify the explanation, the above has described the motion vector to be selected by the motion vector detection unit 14, focusing the x-components of the motion vectors in the reference picture. In the same manner as described for the processing focusing the x-components, the motion vector detection unit 14 may select the motion vector by focusing the y-components.

Note that the motion vector detection unit 14 may select a motion vector from a reference-picture macroblock having a SAD that is larger than the smallest SAD by a value that is equal to or more than "2". In this case, however, the quality of images generated from the eventually obtained data is reduced.

In the meantime, after outputting the first monitor signal, when the monitor unit 34 detects that an amount of the binary data which is stored in the binary buffer 31 and is not processed reaches the second storage amount V2 that is less than the first storage amount V1, by using the operation of the adaptive quantization unit 4 and the motion vector detection unit 14, the monitor unit 34 outputs the second monitor signal to the motion vector detection unit 14, and the offset unit 21 in the adaptive quantization unit 4.

In this case, the binary buffer 31 is detected to have an enough available space, so that the motion vector detection unit 14 selects a motion vector from a reference-picture macroblock having the smallest SAD to the encoding-target-picture macroblock.

Note that the second storage amount V2 may be equal to the first storage amount V1.

As described above, when the amount of the binary data which is stored in the binary buffer 31 and not applied with the entropy encoding reaches the first storage amount V1 thereby nearly causing the overflow, the video encoding device 100 according to the present embodiment reduces an encode length of binary data which is obtained from the binarization unit 30 by using the adaptive quantization unit 4 and the motion vector detection unit 14. Thereby, according to the video encoding device 100 of the present embodiment, it is possible to reduce the capacity of the binary buffer 31 without adding processing for reducing the capacity of the binary buffer 31, in other words, without increasing a size of the video encoding device 100. It is also possible to process the video signal in real time. It is further possible to prevent reduction in the quality of images (including resolution and the like) generated from the eventually obtained data.

Note that, in the above-described embodiment, the SAD is used as an estimation value of the motion vector. However, as the estimation value of the motion vector, a mean square error (MSE), a mean absolute value error (MAE), or the like may be also used.

Note also that, when the binary buffer 31 is detected to nearly cause overflow, one of the adaptive quantization unit 4 and the motion vector detection unit 14 may perform the above operation to reduce the encode length of the binary data obtained from the binarization unit 30.

Note also that, even without the possibility of overflow in the binary buffer 31, one or both of the adaptive quantization unit 4 and the motion vector detection unit 14 may perform the above operation to reduce the encode length of the binary data obtained from the binarization unit 30.

Although only the exemplary embodiment of the present invention has been described in detail above, those skilled in the art will be readily appreciate that many modifications are possible in the exemplary embodiment without materially departing from the novel teachings and advantages of the present invention. Accordingly, all such modifications are intended to be included within the scope of the present invention.

INDUSTRIAL APPLICABILITY

The video encoding device according to the present invention is useful as a device and the like implemented in a digital video camera, especially as a device implemented in a digital video camera which records AV data encoded with high compression rate onto a recording medium whose recording capacity is limited, such as a semiconductor memory or an optical disk.

What is claimed is:

1. A video encoding device comprising:
a video encoding unit operable to encode a video signal;
a binarization unit operable to binarize an encoded value obtained from said video encoding unit; and an entropy encoding unit operable to apply entropy encoding to binary data obtained from said binarization unit;

wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;

wherein said video encoding device further comprises:
 a storage unit operable to store the binary data obtained from said binarization unit; and
 a monitor unit operable to monitor an amount of the binary data stored in said storage unit which is not to be subjected to the entropy encoding; and wherein said video encoding unit is operable to encode the video signal based on the characteristic when said monitor unit detects that the amount of the binary data which is not to be subjected to the entropy encoding reaches a first predetermined storage amount.

2. A video encoding device comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said video encoding unit includes:
 an orthogonal transform unit operable to apply orthogonal transformation to the video signal; and
 an adaptive quantization unit operable to quantize a value obtained from said orthogonal transform unit; and
wherein said adaptive quantization unit is operable to subtract an offset value from the value obtained from said orthogonal transform unit and to quantize the subtracted result, so that an amount of binary data obtained from said binarization unit by binarizing the quantized value is less than an amount of binary data obtained by binarizing the value which is obtained from said orthogonal transform unit without subtracting the offset value.

3. The video encoding device according to claim 2,
wherein said binarization unit is operable to binarize the encoded value by using a Golomb encoding; and
when a number of bits of first binary data is larger than a number of bits of second binary data, said adaptive quantization unit is operable to subtract the offset value from the value obtained from said orthogonal transform unit and to quantize the subtracted result based on a table used in the Golomb encoding, the first binary data being obtained by subjecting the Golomb encoding to a first encoded value obtained by quantizing the value obtained from said orthogonal transform unit without subtracting the offset value, the second binary data being obtained by subjecting the Golomb encoding to a second encoded value that is a value of the first encoded value minus 1, and the first encoded value being a singular point.

4. The video encoding device according to claim 3,
wherein, when the first encoded value is one of 15, 17, 21, 29 and 45, said adaptive quantization unit is operable to subtract the offset value from the value obtained from said orthogonal transform unit and to quantize the subtracted result.

5. The video encoding device according to claim 2,
wherein said binarization unit is operable to binarize the encoded value by using a Golomb encoding; and
when a first Golomb encode length is longer than a second Golomb encode length, said adaptive quantization unit is operable to subtract the offset value from the value obtained from said orthogonal transform unit and to quantize the subtracted result, the first Golomb encode length being an amount of binary data which is obtained by binarizing a first encoded value obtained from said orthogonal transform unit without subtracting the offset value, and the second Golomb encode length being an amount of binary data which is obtained by binarizing a second encoded value obtained by subtracting the offset value from the first encoded value.

6. The video encoding device according to claim 2,
wherein said binarization unit is operable to binarize the encoded value by using a Golomb encoding; and
said adaptive quantization unit is operable to:
output a second encoded value when a first Golomb encode length is longer than a second Golomb encode length, the first Golomb encode length being an amount of a first binary data which is obtained by binarizing a first encoded value obtained by quantizing the value obtained from said orthogonal transform unit without subtracting the offset value, and the second Golomb encode length being an amount of a second binary data which is obtained by binarizing the second encoded value obtained by subtracting the offset value of 1 from the first encoded value; and
output the first encoded value when the first Golomb encode length is equal to the second Golomb encode length.

7. The video encoding device according to claim 6,
wherein said adaptive quantization unit is operable to output the second encoded value when the first encoded value is one of 15, 17, 21, 29, and 45, and to output the first encoded value when the first encoded value is not any one of 15, 17, 21, 29, and 45.

8. The video encoding device according to claim 2 further comprising:
a storage unit operable to store the binary data obtained from said binarization unit; and
a monitor unit operable to monitor an amount of the binary data stored in said storage unit which is not to be subjected to the entropy encoding;
wherein, when said monitor unit detects that the amount of the binary data which is not to be subjected to the entropy encoding reaches a first predetermined storage amount, said video encoding unit is operable to subtract the offset value from the value obtained from said orthogonal transform unit and to quantize the subtracted result.

9. The video encoding device according to claim 8,
wherein, when said monitor unit detects that the amount of the binary data which is not to be subjected to the entropy encoding reaches a second predetermined storage amount after exceeding the first predetermined storage amount, said adaptive quantization unit is operable to quantize the value obtained from said orthogonal transform unit without subtracting the offset value, the second predetermined storage amount being equal to or less than the first storage amount.

10. A video encoding device comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said video encoding unit includes:
an orthogonal transform unit operable to apply orthogonal transformation to the video signal; and
an adaptive quantization unit operable to quantize a value obtained from said orthogonal transform unit;
wherein said binarization unit is operable to binarize the encoded value by using a Golomb encoding; and
said adaptive quantization unit is operable to:
output a first encoded value when a first Golomb encode length is shorter than a second Golomb encode length, the first Golomb encode length being an amount of binary data which is obtained by binarizing the first encoded value obtained by quantizing a value obtained from said orthogonal transform unit without adding the an offset value, and the second Golomb encode length being an amount of binary data which is obtained by binarizing the second encoded value obtained by adding the offset value to the value obtained from said orthogonal transform unit; and
output the second encoded value when the first Golomb encode length is equal to the second Golomb encode length.

11. The video encoding device according to claim 10, wherein said adaptive quantization unit is operable to output the first encoded value when the first encoded value is one of 14, 16, 20, 28, and 44, and to output the second encoded value when the first encoded value is not any one of 14, 16, 20, 28, and 44.

12. A video encoding device comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said video encoding unit includes a motion vector detection unit operable to detect a motion vector between pictures in the video signal; and
wherein said motion vector detection unit is operable to select a motion vector from respective motion vectors of a plurality of reference-picture macroblocks, so that an amount of binary data which is obtained from said binarization unit by using the selected motion vector is less than an amount of binary data which is obtained by encoding and binarizing a value of a motion vector from a reference-picture macroblock having a smallest estimation value.

13. The video encoding device according to claim 12,
wherein said binarization unit is operable to binarize the encoded value by using a Golomb encoding; and
said motion vector detection unit is operable to select a second motion vector having at least one of a second value and a fourth value, in at least one of the following cases:
a first Golomb encode length is longer than a second Golomb encode length, the first Golomb encode length being an amount of a first binary data obtained by binarizing an absolute value represented by an x-coordinate of a first motion vector from the reference-picture macroblock having the smallest estimation value, and the second Golomb encode length being an amount of a second binary data obtained by binarizing a second value that is less than the absolute value represented by the x-coordinate by a predetermined value; and
a third Golomb encode length is longer than a fourth Golomb encode length, the third Golomb encode length being an amount of a third binary data obtained by binarizing an absolute value represented by a y-coordinate of the first motion vector, and the fourth Golomb encode length being an amount of a fourth binary data obtained by binarizing the fourth value that is less than the absolute value represented by the y-coordinate by a predetermined value.

14. The video encoding device according to claim 13,
wherein said motion vector detection unit is operable to select the second motion vector when one of the absolute value represented by the x-coordinate and the absolute value represented by the y-coordinate of the first motion vector is one of 9, 17, and 33, and to select the first motion vector when one of the absolute value represented by the x-coordinate and the absolute value represented by the y-coordinate is not any one of 9, 17, and 33.

15. The video encoding device according to claim 12,
wherein the estimation value is a sum of absolute differential values between the reference-picture macroblock and a encoding-target-picture macroblock.

16. The video encoding device according to claim 12, further comprising:
a storage unit operable to store the binary data obtained from said binarization unit; and
a monitor unit operable to monitor an amount of the binary data stored in said storage unit which is not to be subjected to the entropy encoding;
wherein, when said monitor unit detects that the amount of the binary data which is not subjected to the entropy encoding reaches a first predetermined storage amount, said motion vector detection unit is operable to select a motion vector, so that an amount of binary data which is obtained from said binarization unit by using the selected motion vector is less than an amount of binary data obtained by encoding and binarizing a value of a motion vector from the reference-picture macroblock having the smallest estimation value.

17. The video encoding device according to claim 16,
wherein said motion vector detection unit is operable to select the motion vector from the reference-picture macroblock having the smallest estimation value when said monitor unit detects that the amount of the binary data which is not subjected to the entropy encoding reaches a second predetermined storage amount after exceeding the first predetermined storage amount, the second predetermined storage amount being equal to or less than the first predetermined storage amount.

18. A video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said video encoding method further comprises:
storing the binary data obtained in said binarizing; and
monitoring an amount of the binary data stored in said storing which is not to be subjected to the entropy encoding; and
wherein said encoding comprises encoding the video signal based on the characteristic when said monitoring detects that the amount of the binary data which is not to be subjected to the entropy encoding reaches a first predetermined storage amount.

19. A video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said encoding comprises:
applying orthogonal transformation to the video signal; and
quantizing a value obtained in said applying orthogonal transformation; and
wherein said quantizing comprises subtracting an offset value from the value obtained in said applying orthogonal transformation and quantizing the subtracted result, so that an amount of binary data obtained in said binarizing by binarizing the quantized value is less than an amount of binary data obtained by binarizing the value which is obtained in said applying orthogonal transformation without subtracting the offset value.

20. A video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said encoding comprises:
applying orthogonal transformation to the video signal; and
quantizing a value obtained in said applying orthogonal transformation;
wherein said binarizing comprises binarizing the encoded value by using a Golomb encoding; and
said quantizing comprises:
outputting a first encoded value when a first Golomb encode length is shorter than a second Golomb encode length, the first Golomb encode length being an amount of binary data which is obtained by binarizing the first encoded value obtained by quantizing a value obtained in said applying orthogonal transformation without adding an offset value, and the second Golomb encode length being an amount of binary data which is obtained by binarizing the second encoded value obtained by adding the offset value to the value obtained in said applying orthogonal transformation; and
outputting the second encoded value when the first Golomb encode length is equal to the second Golomb encode length.

21. A video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said encoding comprises detecting a motion vector between pictures in the video signal; and
wherein said detecting comprises selecting a motion vector from respective motion vectors of a plurality of reference-picture macroblocks, so that an amount of binary data which is obtained in said binarizing by using the selected motion vector is less than an amount of binary data which is obtained by encoding and binarizing a value of a motion vector from a reference-picture macroblock having a smallest estimation value.

22. A non-transitory computer-readable medium storing instructions for causing a computer to perform a video encoding method, said video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said video encoding method further comprises:
storing the binary data obtained in said binarizing; and
monitoring an amount of the binary data stored in said storing which is not to be subjected to the entropy encoding; and
wherein said encoding comprises encoding the video signal based on the characteristic when said monitoring detects that the amount of the binary data which is not to be subjected to the entropy encoding reaches a first predetermined storage amount.

23. A non-transitory computer-readable medium storing instructions for causing a computer to perform a video encoding method, said video encoding method comprising:

encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said encoding comprises:
applying orthogonal transformation to the video signal; and
quantizing a value obtained in said applying orthogonal transformation; and
wherein said quantizing comprises subtracting an offset value from the value obtained in said applying orthogonal transformation and quantizing the subtracted result, so that an amount of binary data obtained in said binarizing by binarizing the quantized value is less than an amount of binary data obtained by binarizing the value which is obtained in said applying orthogonal transformation without subtracting the offset value.

24. A non-transitory computer-readable medium storing instructions for causing a computer to perform a video encoding method, said video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said encoding comprises:
applying orthogonal transformation to the video signal; and
quantizing a value obtained in said applying orthogonal transformation;
wherein said binarizing comprises binarizing the encoded value by using a Golomb encoding; and
said quantizing comprises:
outputting a first encoded value when a first Golomb encode length is shorter than a second Golomb encode length, the first Golomb encode length being an amount of binary data which is obtained by binarizing the first encoded value obtained by quantizing a value obtained in said applying orthogonal transformation without adding an offset value, and the second Golomb encode length being an amount of binary data which is obtained by binarizing the second encoded value obtained by adding the offset value to the value obtained in said applying orthogonal transformation; and
outputting the second encoded value when the first Golomb encode length is equal to the second Golomb encode length.

25. A non-transitory computer-readable medium storing instructions for causing a computer to perform a video encoding method, said video encoding method comprising:
encoding a video signal;
binarizing an encoded value obtained in said encoding; and
applying entropy encoding to binary data obtained in said binarizing;
wherein in said encoding of the video signal, the video signal is encoded based on a characteristic of said binarizing, so that an amount of binary data obtained in said binarizing of the encoded value based on the characteristic is less than an amount of binary data obtained in said binarizing of an encoded value that is encoded without being based on the characteristic;
wherein said encoding comprises detecting a motion vector between pictures in the video signal; and
wherein said detecting comprises selecting a motion vector from respective motion vectors of a plurality of reference-picture macroblocks, so that an amount of binary data which is obtained in said binarizing by using the selected motion vector is less than an amount of binary data which is obtained by encoding and binarizing a value of a motion vector from a reference-picture macroblock having a smallest estimation value.

26. An integrated circuit comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said integrated circuit further comprises:
a storage unit operable to store the binary data obtained from said binarization unit; and
a monitor unit operable to monitor an amount of the binary data stored in said storage unit which is not to be subjected to the entropy encoding; and
wherein said video encoding unit is operable to encode the video signal based on the characteristic when said monitor unit detects that the amount of the binary data which is not to be subjected to the entropy encoding reaches a first predetermined storage amount.

27. An integrated circuit comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said video encoding unit includes:
an orthogonal transform unit operable to apply orthogonal transformation to the video signal; and
an adaptive quantization unit operable to quantize a value obtained from said orthogonal transform unit; and
wherein said adaptive quantization unit is operable to subtract an offset value from the value obtained from said orthogonal transform unit and to quantize the subtracted result, so that an amount of binary data obtained from said binarization unit by binarizing the quantized value is less than an amount of binary data obtained by binarizing the value which is obtained from said orthogonal transform unit without subtracting the offset value.

28. An integrated circuit comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said video encoding unit includes:
an orthogonal transform unit operable to apply orthogonal transformation to the video signal; and
an adaptive quantization unit operable to quantize a value obtained from said orthogonal transform unit;
wherein said binarization unit is operable to binarize the encoded value by using a Golomb encoding; and
said adaptive quantization unit is operable to:
output a first encoded value when a first Golomb encode length is shorter than a second Golomb encode length, the first Golomb encode length being an amount of binary data which is obtained by binarizing the first encoded value obtained by quantizing a value obtained from said orthogonal transform unit without adding an offset value, and the second Golomb encode length being an amount of binary data which is obtained by binarizing the second encoded value obtained by adding the offset value to the value obtained from said orthogonal transform unit; and
output the second encoded value when the first Golomb encode length is equal to the second Golomb encode length.

29. An integrated circuit comprising:
a video encoding unit operable to encode a video signal;
a binarization unit operable to binarize an encoded value obtained from said video encoding unit; and
an entropy encoding unit operable to apply entropy encoding to binary data obtained from said binarization unit;
wherein said video encoding unit is operable to encode the video signal based on a characteristic of the binarization performed by said binarization unit, so that an amount of binary data obtained from said binarization unit by binarizing the encoded value that is encoded based on the characteristic is less than an amount of binary data obtained by binarizing an encoded value that is encoded without being based on the characteristic;
wherein said video encoding unit includes a motion vector detection unit operable to detect a motion vector between pictures in the video signal; and
wherein said motion vector detection unit is operable to select a motion vector from respective motion vectors of a plurality of reference-picture macroblocks, so that an amount of binary data which is obtained from said binarization unit by using the selected motion vector is less than an amount of binary data which is obtained by encoding and binarizing a value of a motion vector from a reference-picture macroblock having a smallest estimation value.

* * * * *